Jan. 17, 1933.    G. DUFFING    1,894,369
VISCOMETER
Filed Jan. 4, 1930
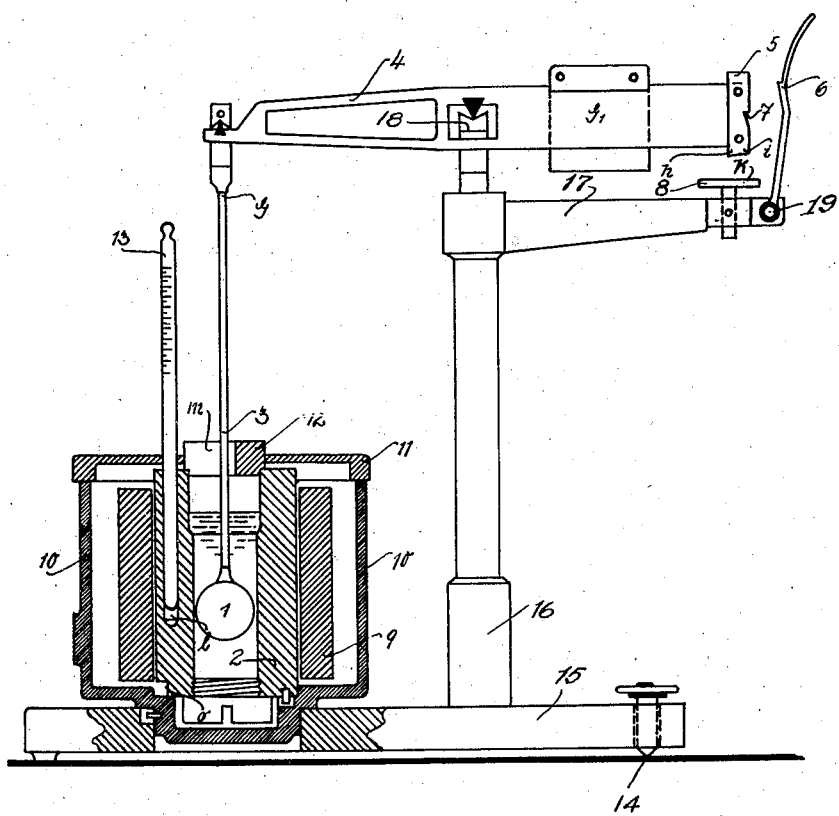
G. Duffing INVENTOR
By: Marks & Clerk Attys.

Patented Jan. 17, 1933

1,894,369

UNITED STATES PATENT OFFICE

GEORG DUFFING, OF HAMBURG, GERMANY

VISCOMETER

Application filed January 4, 1930, Serial No. 418,603, and in Germany February 7, 1928.

An application has been filed in Germany February 7, 1928.

My invention relates to improvements in devices for examining the absolute viscocity of liquids especially oils, lac, varnish etc. The methods used hitherto depend on the velocity of a falling sphere either in the free liquid or in a cylinder filled with the liquid. The viscosity numbers resulting from these methods are uncertain in consequence of the impossibility of an exact time-record and control of the true movement of the sphere, which besides their translative displacement were able to rotate in an uncontrolled manner.

What I aim at, is to show on a sufficiently large scale outside of a cylinder the exact measurement of time expressed by the distance travelled by a rising sphere driven with the aid of a balance.

The beginning of the movement of the sphere is fixed by a snap and the end of the stroke is exactly indicated by a metallic mirror, efficient in every case, no matter if the fluid is dark or transparent.

The instrument may be described as follows with reference to the accompanying drawing, which represents a side elevation and part section of the apparatus.

The instrument may be described as follows with reference to the accompanying drawing, in which the figure represents a side elevation, showing an intersection of a cup 10 standing on a baseplate 15, rigidly connected with the pillar 16 of the balance. The pillar 16 has a sideways projecting arm 17 and the pan 18 for the fulcrum of the balance-arm 4. At the end of the arm 17 is the pivot 19 for the snap-lever 6 determining the lowest position of the ball 1 and the mirror block 8 is supported in arm 17 for limiting the movement of the balance-arm 4 in the highest position of the ball 1. The upper surface $k$ of the block 8 is highly polished, thus offering a metallic mirror in which the image of the knife-edge $h$, $i$ appears.

In the cup 10 with the cover 11 stands the cylinder 2 containing the testing fluid in which the ball 1 is immersed and suspended by the rod 3 at the end of the balance-arm 4.

The electric heater 9 effects a temperature of the testing fluid, which is indicated by the thermometer 13. The lid 12 covering the upper opening of the reservoir prevents loss of heat so that a constant temperature of the liquid can easily be maintained.

The characteristic feature of the invention is the ball 1 with a very smooth surface, sliding in the cylinder 2 having a highly polished inner surface, the ball being rigidly connected with a rod 3, which is suspended on a knife edge of the balance-arm 4.

The lowest position of the ball is when the snap-lever 6 meshes with the groove or slot 7, the highest position of the ball is when the knife-edge $h$—$i$ along its entire length is resting upon the metallic mirror 8, or in other words when it contacts completely with the plane surface $k$ of the mirror allowing a sharp observation of the movement when the ball has made its full stroke.

The function of the mirror is as follows:

Instead of observing the contact of the knife edge $h$—$i$ with the face $k$ of the mirror 8, I prefer to consider the coincidence of the knife edge with its image reflected by the polished surface $k$ of the block. Since the relative velocity of the edge $h$—$i$ against its image is twice the absolute velocity of $h$—$i$, the coincidence is very sharply marked, especially because the fine dark line, which appears between edge $h$—$i$ and its image shortly before coincidence, disappears in the moment when the contact is perfect.

The absolute viscosity of the testing liquid is proportional to the time required for the stroke of the ball, the velocity thereof being constant during the main part of the stroke. The period of inevitable acceleration at the beginning of the stroke is so insignificant that it always can be neglected in the analysis of the tests.

The ball is totally immersed in the fluid, so that capillary phenomena cannot influence the test.

Means are provided for heating the cylinder with the fluid, for instance, an electrical heater 9 surrounding the cylinder situated in the cup 10 with the cover 11 and insured against the loss of heat by the layer of air surrounding the cylinder and heater with exception of the base of the cylinder. The circular edge of the base of the cylinder is removed with exception of three or four small portions $o$ upon which it stands on the bottom of the cup, in this manner offering only small areas for heat conduction. The lid 12, provided with a slot $m$, permits the passage of the rod 3 and its withdrawal without removing the ball and rod out of working position. The thermometer 13 inserted in the hole in the cylinder indicates the temperature of the cylinder and testing fluid. Set screws 14 are provided to bring the whole apparatus in the right working position.

The instrument belongs to the class of absolute viscometers, the constant C of the instrument being determined by the radius $a$ of the ball, the inner radius $b$ of the cylinder and the stroke H of the ball (centimeter-gram system)

$$C = 31.4b.H\frac{1-2.99\epsilon}{\epsilon 5/2} \epsilon = \frac{b-a}{a}$$

Then the absolute viscosity $\mu$ is found by the equation $$\frac{C\mu}{T} = G + A - W$$

where T is the time indicated by a stop watch for the stroke H and G the pull of the balance, $$A = \frac{4}{3}\pi a^3 . \gamma, \gamma =$$

specific gravity and W the frictional resistance of the balance. T is the time elapsed from the moment the snap G is drawn out of the notch 7 until the edge $h—i$ lies along the surface of the mirror 8. A and W can be eliminated when two tests are made at the same temperature. The two equations $$\frac{C\mu}{T_1} = G_1 + A - W$$

$$\frac{C\mu}{T_2} = G_2 + A - W$$

show $$\mu = \frac{G_2 - G_1}{C} \circ \frac{T_1 T_2}{T_1 - T_2}$$

Then, while W is known, A can be found and $$\gamma = \frac{3}{4}\frac{A}{\pi a 3}$$

Therefore also the kinematic viscosity equal to $\mu/\gamma$ will be known.

What I claim is:

1. An apparatus for determining the viscosity of liquids, comprising a massive testing cylinder adapted to contain the liquid, a ball adapted to be immersed in said liquid, a rod connected to said ball, a balance-arm from one end of which said rod is suspended and being notched at its other end, a counterweight adjacent the notched end of the balance arm and adapted to balance said ball, rod and arm, said weight being fixed to the arm of the balance so that the system is in equilibrium in air, a cup in which said cylinder is disposed, a cover for said cup having an aperture therein concentric with said cylinder, a lid received in said aperture and having a radially directed slot through which said rod passes, said cup, cover and lid providing an enclosed air space around said cylinder in order to insure against loss of heat therefrom.

2. In an apparatus as described in claim 1, a device for indicating exactly the beginning and termination of the movement of the ball, said device including a snap-member adapted to mesh with the notch in said balance arm at the beginning of the stroke, a knife edge on said arm and a mirror with which said knife-edge is adapted to contact at the end of the stroke.

In testimony whereof I affix my signature.

GEORG DUFFING.